(12) United States Patent
Palfenier et al.

(10) Patent No.: US 7,735,470 B2
(45) Date of Patent: Jun. 15, 2010

(54) THROTTLE CONTROL CARTRIDGE WITH DOUBLE CAM TO FORCE IDLE POSITION

(75) Inventors: Samuel Roland Palfenier, El Paso, TX (US); Manuel A Quintana, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 305 days.

(21) Appl. No.: 12/008,231

(22) Filed: Jan. 9, 2008

(65) Prior Publication Data

US 2008/0163850 A1 Jul. 10, 2008

Related U.S. Application Data

(60) Provisional application No. 60/879,661, filed on Jan. 10, 2007.

(51) Int. Cl.
*F02D 11/02* (2006.01)
*F02D 11/04* (2006.01)

(52) U.S. Cl. ...................................... 123/400; 74/551.9

(58) Field of Classification Search .................. 123/400, 123/399, 376, 403, 319; 73/114.36; 180/167, 180/170, 174, 178, 335; 74/551.9, 551.8, 74/558, 510, 511 R, 523, 525, 551.1, 551.2; 335/37

See application file for complete search history.

(56) References Cited

U.S. PATENT DOCUMENTS

| | | | |
|---|---|---|---|
| 6,276,230 B1 * | 8/2001 | Crum et al. | 74/551.9 |
| 7,287,512 B2 * | 10/2007 | Possehl et al. | 123/400 |
| 2007/0157902 A1 * | 7/2007 | Possehl et al. | 123/400 |

* cited by examiner

*Primary Examiner*—Mahmoud Gimie
(74) *Attorney, Agent, or Firm*—Thomas N. Twomey

(57) ABSTRACT

A throttle control cartridge has a circuit board carrying a Hall-effect sensor, the position of which is fixed in a housing carrying a cam. A shaft carrying a magnet is rotatably and translatably disposed with respect to the housing and carries a cam follower that engages the cam and translates the shaft with respect to the housing when the shaft is rotated with respect to the housing in at least one of two opposed angular directions. The cam and the cam follower have at least first and second pairs of cam surfaces in which a first cam surface is disposed at a different cam or helix angle then the second cam surface. A redundant stop is cooperatively formed between the cam follower and splines on the shaft to limit axial translation of the cam follower in one direction of rotation of the shaft relative to the housing.

6 Claims, 16 Drawing Sheets

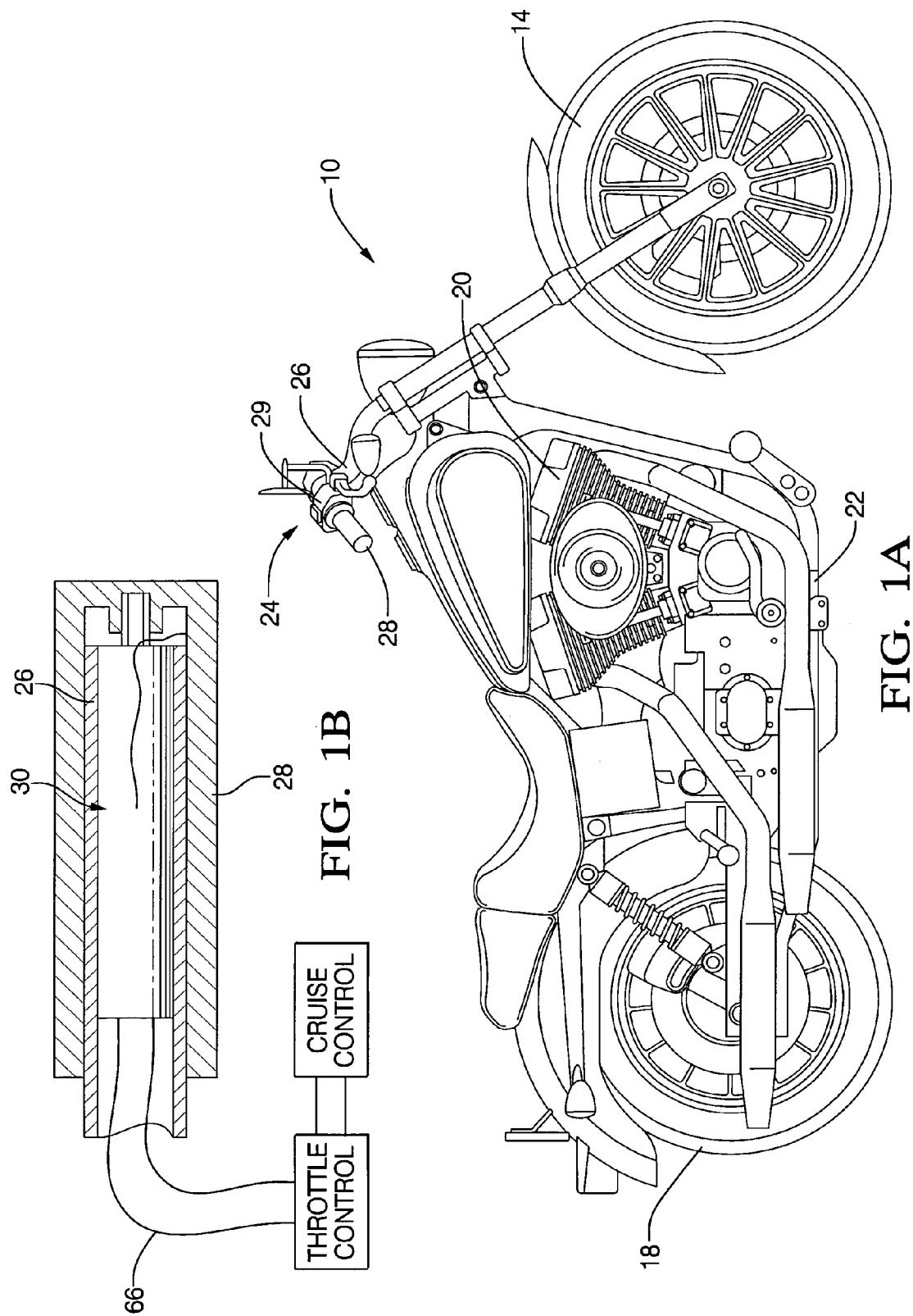

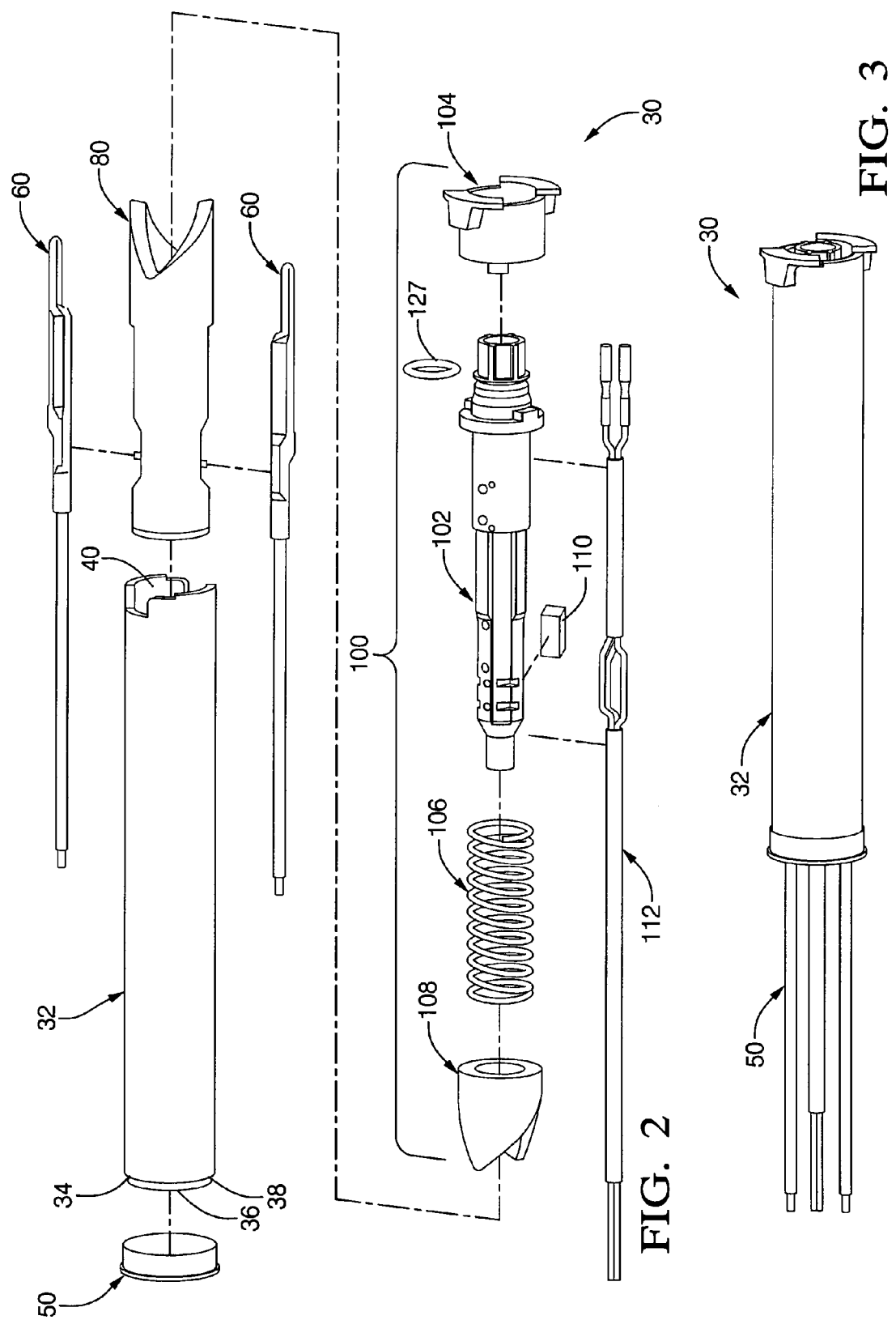

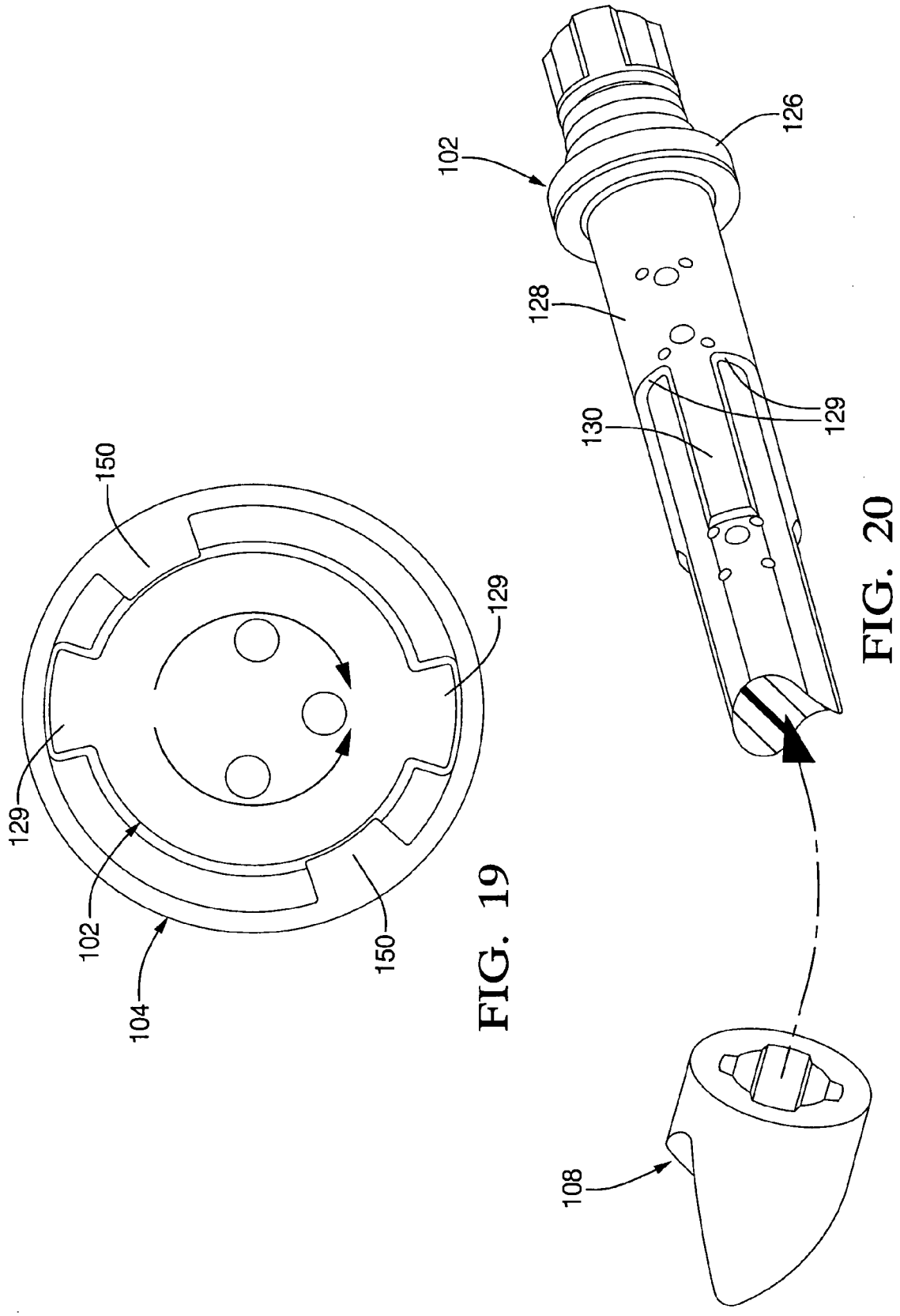

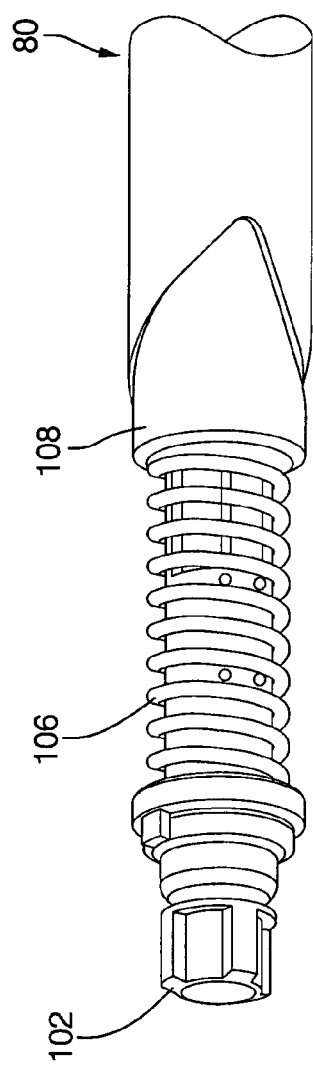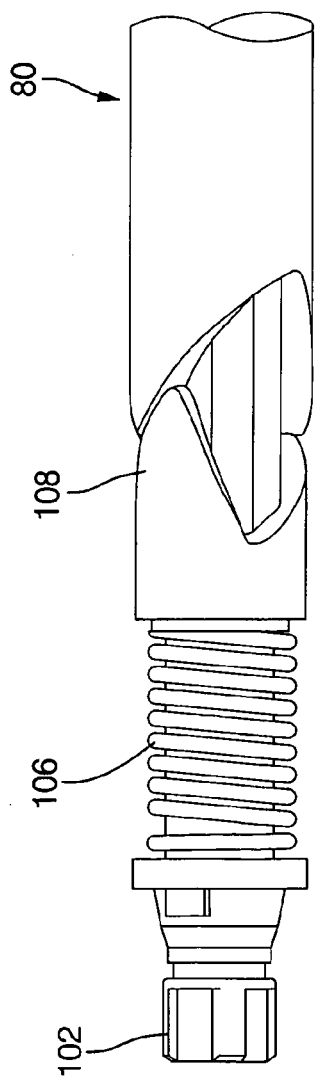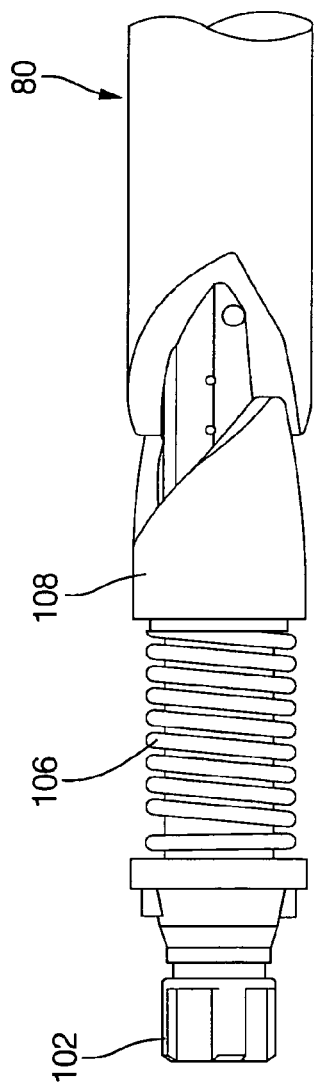
FIG. 27 A
FIG. 27 B
FIG. 27 C

THROTTLE CONTROL CARTRIDGE WITH DOUBLE CAM TO FORCE IDLE POSITION

This application claims the benefit to the filing date of U.S. Provisional Patent Application Ser. No. 60/879,661 filed Jan. 10, 2007, the contents of which are incorporated herein in their entirety.

TECHNICAL FIELD

This invention relates to an engine throttle control apparatus.

BACKGROUND OF THE INVENTION

Control handles are often used for controlling the speed of a vehicle that is steered by a handle bar, such as a motorcycle, a snowmobile or a personal watercraft. such vehicles may also be equipped with cruise control to maintain a set speed and a control handle or handgrip to control the throttle of an engine manually as well as deactivate cruise control.

In a throttle position sensor with a cruise-off feature, the throttle is usually spring loaded with a torsion spring against a stop. In this particular application, an off-throttle position was needed to turn the cruise control off. This was accomplished with a cam that would be steep enough to stop the throttle return force and momentum but at the same time not be too steep to make the off-throttle force too high. This created an issue that required a fine tuned balance between the force of the torsion spring and the cam angle and it became difficult to have the desired feel for the throttle and at the same time not overshoot the idle position.

For a throttle by wire twist grip sensor, it is essential to have a redundant stop for safety reasons. Due to the small packaging area, a space efficient redundant stop must be designed. A traditional stop is designed as the primary stop. Due to the confined space, the primary stops provide only a small safety factor.

SUMMARY OF THE INVENTION

A throttle control cartridge includes a first member carrying a Hall-effect sensor; a second member carrying a magnet, the second member being rotatable and translatable with respect to the first member; means to position the first member with respect to the second member so that the Hall-effect sensor senses a predetermined magnetic flux density of the magnet; a cam having a cam surface at a first cam angle carried by one of the first and second members and a cam follower having a cam follower surface at second cam angle different from first cam angle carried by another of the first and second members. The cam follower moves away from the cam responsive to rotation of the second member with respect to the first member in the first direction and engages the cam and translates the other of the first and second members with respect to the one of the first and second members responsive to rotation of the second member with respect to the first member in an opposition direction; means to change the magnetic flux density sensed by the Hall-effect sensor in one direction responsive to rotation of the second member with respect to the first member in a first direction; and means to change the magnetic flux density sensed by the Hall-effect sensor in an opposite direction responsive to translation of the second member with respect to the first member.

A control cartridge in which a redundant stop includes axially extending splines formed on the second member; and spline engagement members carried on the cam follower to control axial movement of the cam follower along the second member during rotation of the second member. The splines on the second member have ends such that engagement of the spline engagement members on the cam follower with the ends of the spline defines the redundant stop of rotation of the second member.

The present throttle control cartridge utilizes unique cam and cam follower surfaces wherein a first cam surface, which may be a double-sided cam surface is disposed at a different helix angle then an opposed second cam surface, which may also be a double-sided cam surface, for throttle feel during rotation of the throttle in either positive or negative directions.

The throttle control cartridge also includes a unique redundant stop limiting maximum angular rotation of the throttle in the event that the primary stops by the rotatable shaft in the throttle control cartridge and a stop member fixed to the housing fails. The spline engagement members of the cam follower bottom out and engage the ends of the spline at a maximum stop position of throttle rotation.

BRIEF DESCRIPTION OF THE DRAWINGS

Various features, advantages and other uses of the present invention will become more apparent by referring to the following detailed description and drawing in which:

FIG. 1A is a side elevational view of a motorcycle incorporating a throttle control according to the following disclosure;

FIG. 1B is a schematic cross-sectional view of a control handle with a control cartridge;

FIG. 2 is an exploded, perspective view of one aspect of a throttle control;

FIG. 3 is a perspective view of the throttle control sensor shown in FIG. 2;

FIG. 19 is an end, pictorial view of the primary rotor stop and cap;

FIG. 20 is an exploded, perspective view showing the redundant stop surfaces on the rotor;

FIGS. 27A, 27B, and 27C show respective positions of the cam housing and cam follower from idle position, clockwise throttle movement and counter clockwise throttle movement;

DETAILED DESCRIPTION

Figure 4:
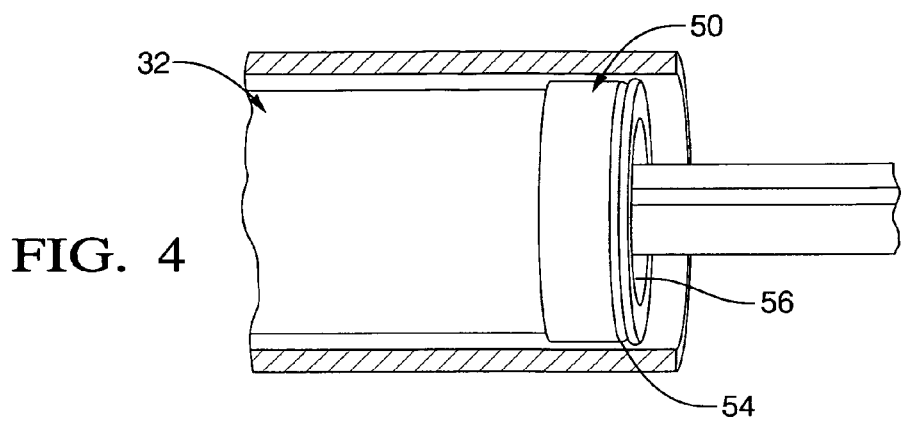
FIG. 4 is a partial, enlarged view showing the attachment of the spacer to the sensor tube.

Before any aspects of throttle control are explained in detail, it is to be understood that the throttle control is not limited in its application to the details of construction and the arrangement of components set forth in the following description or illustrated in the following drawings. The throttle control is capable of other aspects and of being practiced or of being carried out in various ways. Also, it is to be understood that the phraseology and terminology used herein is for the purpose of description and should not be regarded as limiting. The use of "including," "comprising," "having" and variations thereof herein is meant to encompass the items listed thereafter and equivalents thereof as well as additional items. Unless specified or limited otherwise, the terms "mounted," "connected," "supported," and "coupled," and variations thereof, are used broadly and encompass both direct and indirect mountings, connections, supports, and couplings. Further, "connected" and "coupled" are not restricted to physical or mechanical connections or couplings.

Referring now to FIGS. 1A and 2B, there is depicted a control cartridge 30 that can be inserted into a handle bar of a motorcycle or other self-propelled vehicle that is steered by the handle bar. The cartridge 30 transmits an electric signal that allows the operator to control a first device such, as an engine throttle control device and a second device, such a cruise control device.

FIG. 1A illustrates a motorcycle 10 including a front wheel 14, a rear wheel 18, an engine 20 and a frame 22 interconnecting the front and rear wheels 14, 18. The motorcycle 10 also includes a steering assembly 24 coupled to the frame 22. The steering assembly 24 is pivotable about a steering axis and includes a handlebar 26 for imparting such pivotal motion to the steering assembly 24. The handlebar 26 includes a left-side grip (now shown) and a right-side grip 28 that are grasped by an operator to control the motorcycle 10.

The left-side grip is secured to the left-hand end portion of the handlebar 26 and the right-side grip or throttle grip 28 is secured to the right-hand end portion of the handlebar 26. A left control housing (not shown) may be positioned inwardly of the left-side grip, and a right control housing 29 is positioned inwardly of the throttle grip 28. The left control housing and the right control housing 29 are secured to the motorcycle handlebar 26. The left control housing and the right control housing 29 include operator switches that communicate with and control various devices on the motorcycle 10, such as the headlight, the starter, the turn signals, the horn, and other devices as is well known in the art. The illustrated handlebar 26 is a generally continuous hollow tube made from metal such as steel. However, it should be appreciated that other types of handlebars such as two-piece handlebars (e.g., "clip-ons") may also be used in accordance with the present invention.

Figure 5:
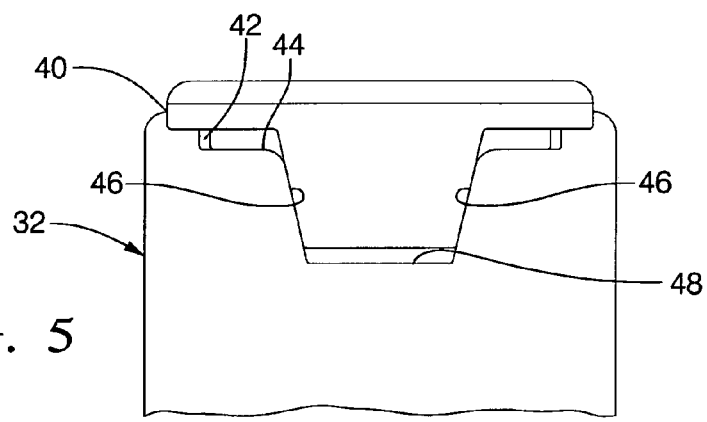
FIG. 5 is an enlarged, partial elevational view showing the interconnection of the stop and the sensor tube.

As shown in FIG. 2, a throttle position sensor 30 is adapted to be coupled to a throttle grip mounted on the right end of the handlebar 26. Throttle position sensor 30 includes a hollow tube 32, the details of which are also shown in FIGS. 3-5. The tube 32 may be formed of any suitable high-strength material, such as steel, for example only. The tube 32 includes the first end 34 and an opposed second end 40. The first end 34 is defined by a shoulder 38 forming a reduced diameter collar 36 at the first end 34. The shoulder 38 and collar 36 are adapted for receiving a spacer 50 as described hereafter and shown in FIG. 4. The first end 40 of the tube 32 is formed with opposed recesses defined by an outer opening 42, a circumferentially extending shoulder 44 and an inner notch defined by inward tapering sides 46 and an inner end 48. The notches form a mount for a stop 104 as described hereafter.

The spacer 50, as shown in detail in FIG. 4, has a hollow bore 56 having an enlarged diameter end flange 54. A bore 56 extends through the spacer 50 for receiving conductors.

Figure 6:
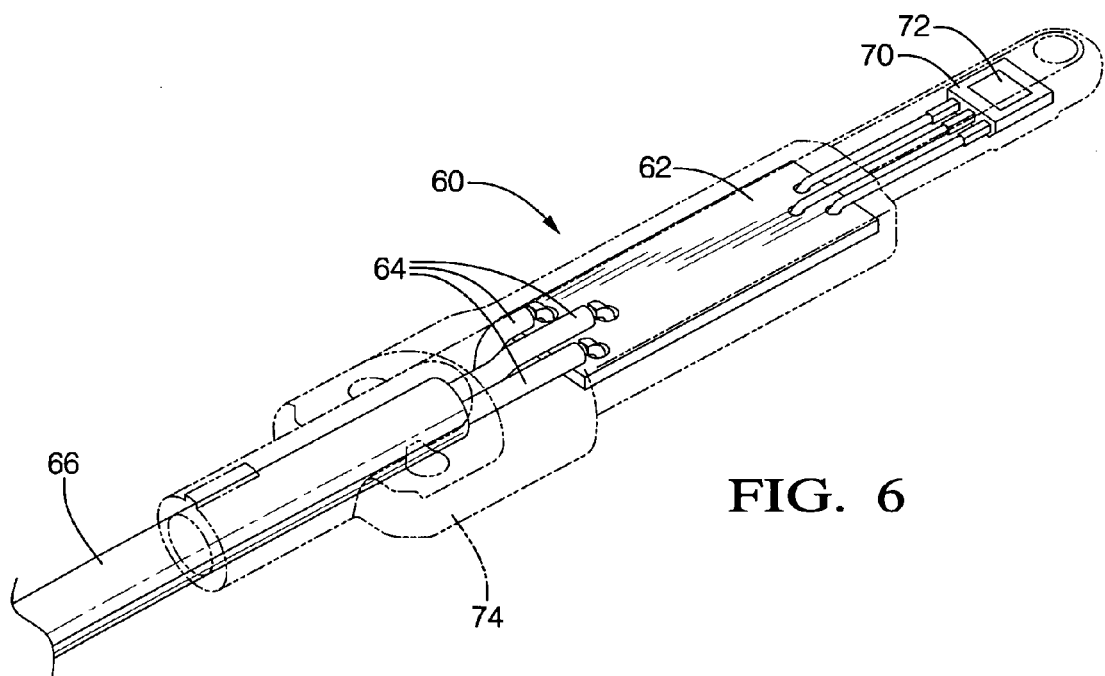
FIG. 6 is a perspective, assembled view of the PC board assembly shown in FIG. 2.
Figure 7:
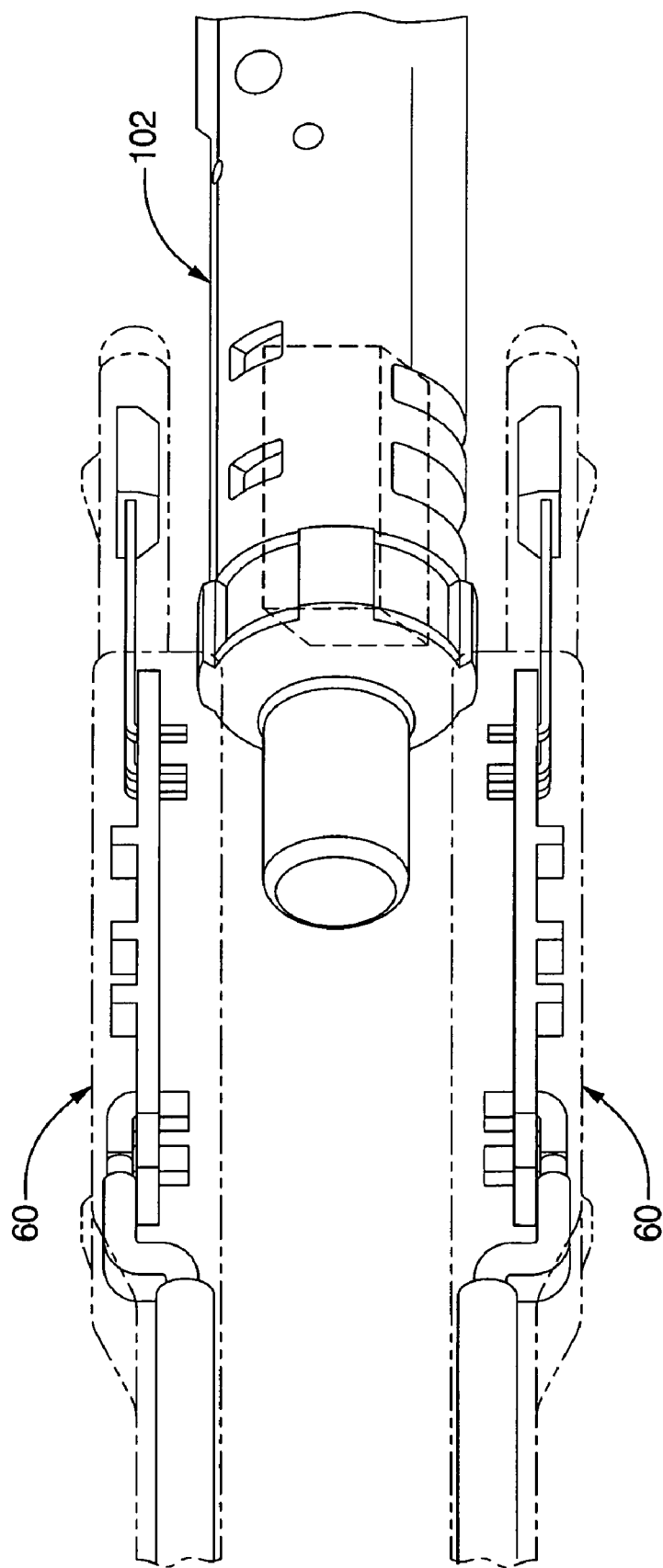
FIG. 7 is a perspective view showing the relative positions of the sensor assembly shown in FIG. 6 and the rotor.

Referring now to FIGS. 6 and 7, there is depicted a sensor assembly including a circuit board, such as a printed circuit board 62 which contains surface mount components, not shown.

A Hall-effect sensor 72 mounted within a sealed housing 70 has conductors extending therefrom to terminations on the printed circuit board 62. As is understood in the art, the Hall-effect sensor 72 is configured to output a voltage proportional to the sensor's movement or orientation in a magnetic field. By example, the Hall-effect sensor 72 includes a small semi-conductive platelet and evaluation circuitry integrated into a single silicon chip. As such, the sensor 72 may output a variable voltage, (i.e., 0-5 volts) directly to the printed circuit board 62 to indicate the movement or orientation of the sensor 72 in the magnetic field.

The sensor 72 may be a programmable, linear Hall-effect sensor, such as that available from Micronas Semi-Conductor Holding AG of Zurich, Switzerland under Model No. Hal815.

Alternately, other types of Hall-effect sensors may be utilized. Further, other types of sensors operable to output a variable voltage dependent upon relative movement or orientation of fixed and moving members may be utilized.

Electrical conductors 64 which may be carried in a sheave or flat cable 66 are also connected to terminations on the printed circuit board 62. The individual wires 64 may also be electrically insulated from each other within the sheave 66. In the illustrated exemplary construction, the conductor or cable 66 includes three individual wires or conductors 64. The exposed ends of the individual wires 64 are electrically connected to the printed circuit board 62.

Once the conductors from the Hall-effect sensor 72 and the wires 64 from the cable 66 are assembled to the printed circuit board 62, the entire assembly is over-molded in a sensor over-mold housing 74, shown in phantom in FIG. 6, to substantially encase the components.

As shown in FIG. 7, two sensor assemblies 60 are mounted within the tube 32 180° apart. Although only one sensor 60 is required for operation, two identical sensors spaced 180° from each other provide complete independent redundancy.

Figures 8, 9:
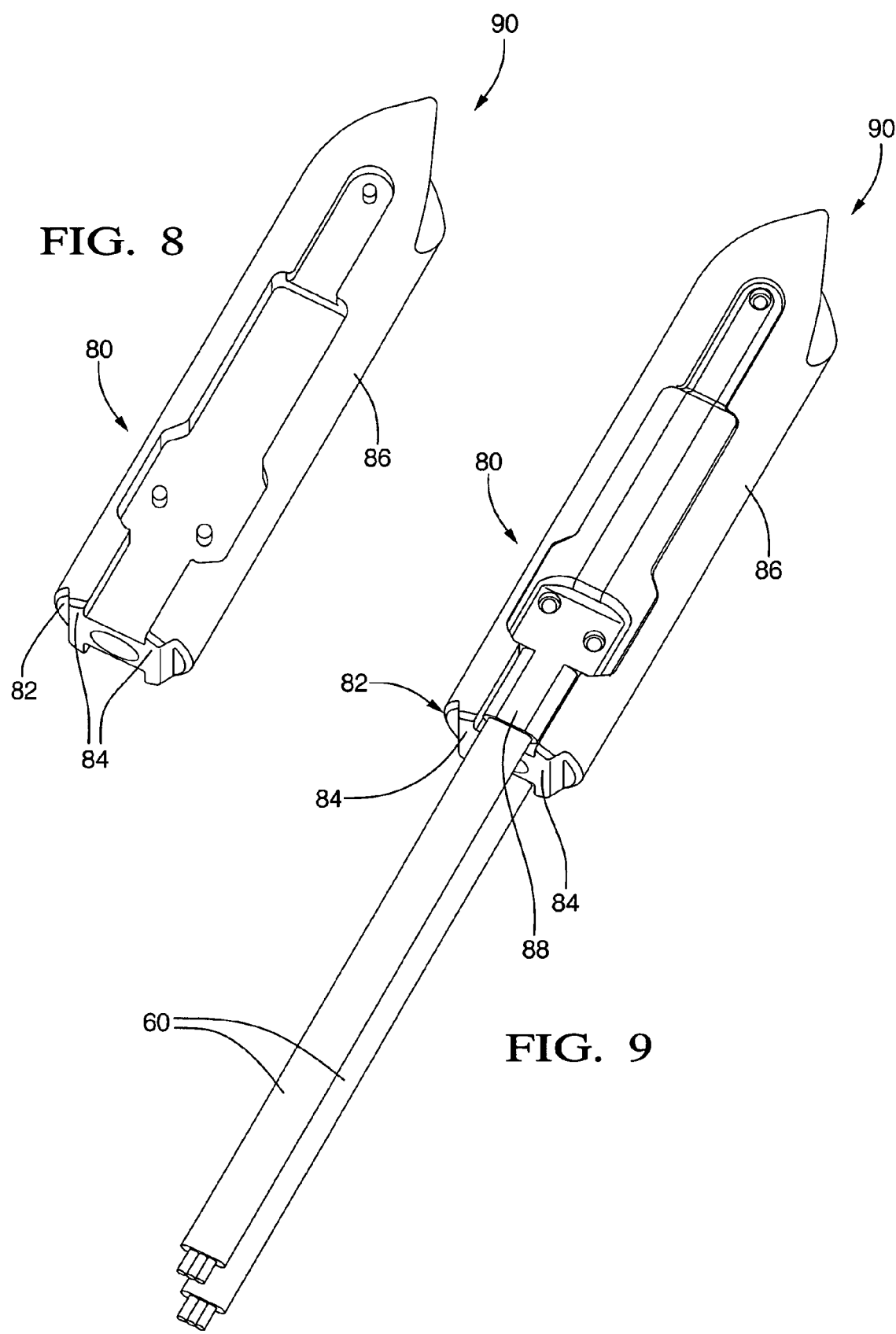
FIG. 8 is an enlarged perspective view of the cam housing shown in FIG. 2.
FIG. 9 is a perspective view showing the assembly of the PC board to the cam housing.
Figure 10:
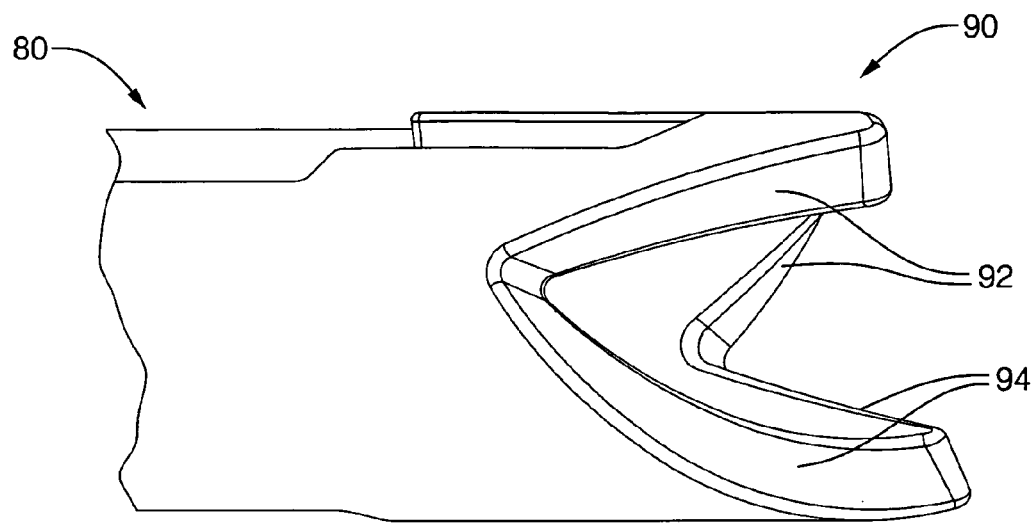
FIG. 10 is an enlarged, perspective view of the cam surfaces at one end of the cam housing shown in FIG. 8.
Figure 11:
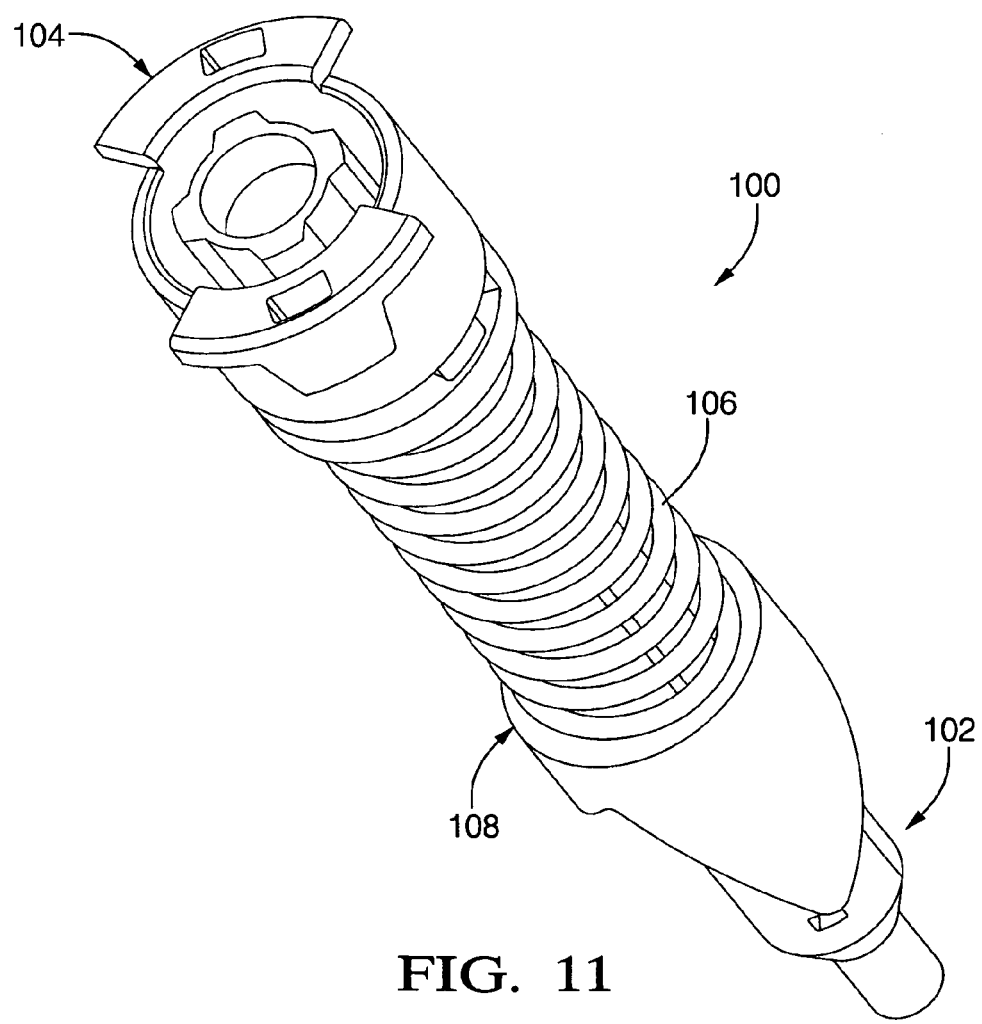
FIG. 11 is a perspective view of the rotor assembly with the outer tube removed.

Referring now to FIGS. 8, 9, and 10, there is shown the cam housing 80 which includes a first end 82 and an opposed second or cam end 90. A pair of opposed recesses 84 are formed at the first end 82 to interface with interference with the tube 32 to prevent rotation between the cam housing 80 and the tube 32.

A recess 86 is formed along one surface of the cam housing 80 for receiving and locating one printed circuit board 62 assembly.

A bore 88 extends through the entire cam housing 90 for passage of conductors from the end of the throttle as shown hereafter. The conductors from the two sensor assemblies 60 are shown in FIG. 9 extending outward from the first end 82 of the cam housing 80.

As shown in FIG. 10, the second end or cam 90 of the cam housing 80 is formed with at least one pair and, by example, opposed pairs of cam surfaces. The first pair of cam surfaces 92 is formed at a high helix angle for off throttle and cruise-off feel. The second pair of cam surfaces 94 is formed at a lower helix angle for on throttle feel.

Referring now to FIGS. 11-21, the details of the rotor assembly 100 will be described. The rotor 102 is in the form of an elongated body formed of a suitable material, such as a molded plastic. The body has a first end 120 and an opposed second end 122 with a through bore extending therethrough. A plurality of splines 124 extend between the first end 120 and a recess 125 which is configured for receiving a seal, such as an o-ring seal, to provide a grip to the sensor interface and also terminal mating orientation.

An enlarged diameter annular flange 126 is spaced from the first end 120. A shaft of substantially constant diameter 128 extends from the flange 126 through a conical transition 132 to an end section 134. A plurality of modified splines 130 are formed along the shank 128 for anti-rotation of a cam follower and axial movement of the cam follower along the rotor 102.

A plurality of keys 129 are formed on the flange 126 for mating interface in only one position.

Figure 12:
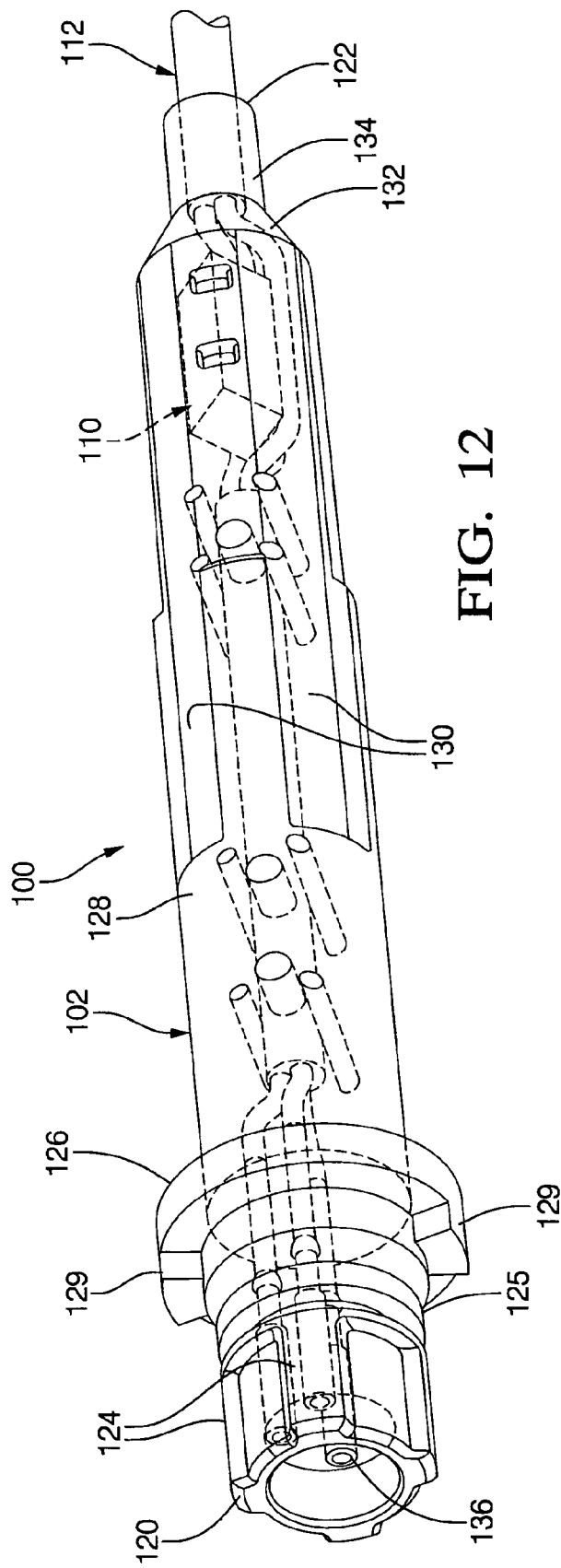
FIG. 12 is a side perspective view of the rotor and magnet of the rotor assembly shown in FIG. 11.
Figure 13:
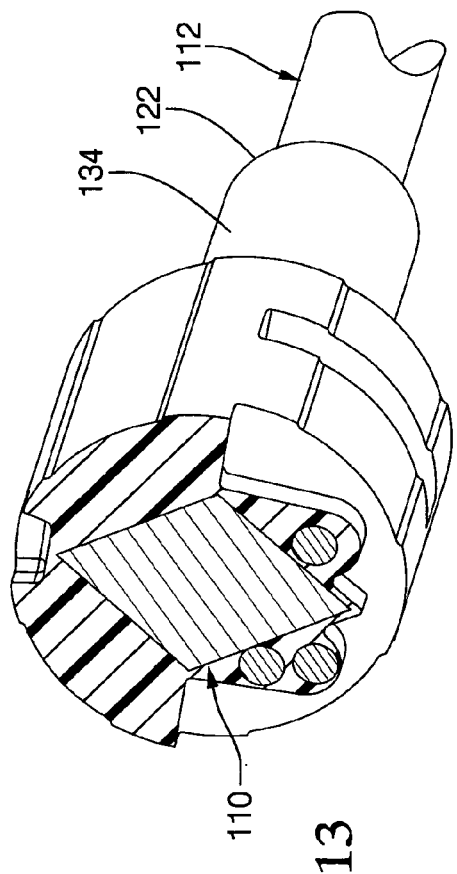
FIG. 13 is an enlarged, cross sectional view showing the mounting of the magnet in the rotor shown in FIG. 11.

A magnet 110 is an insert molded within the rotor 102 at one end of the shank 128, by example only. The square cross section of the magnet 110 allows 140° of rotation with a linear output. A plurality of terminals 136, with three terminals 136, being depicted by way of example only, are formed within a recessed cavity at the first end 120 of the rotor 102. The terminals 136 are connected to insulated conductors which extend through the rotor 102 and out from the second end 122, as shown in FIG. 12. The conductors are individually insulated and may be surrounded by a single insulating sheath. The terminals 136 allow connection to additional sensors or switching elements in the throttle assembly, such as heated wire connections, headlights, etc.

Figure 14:
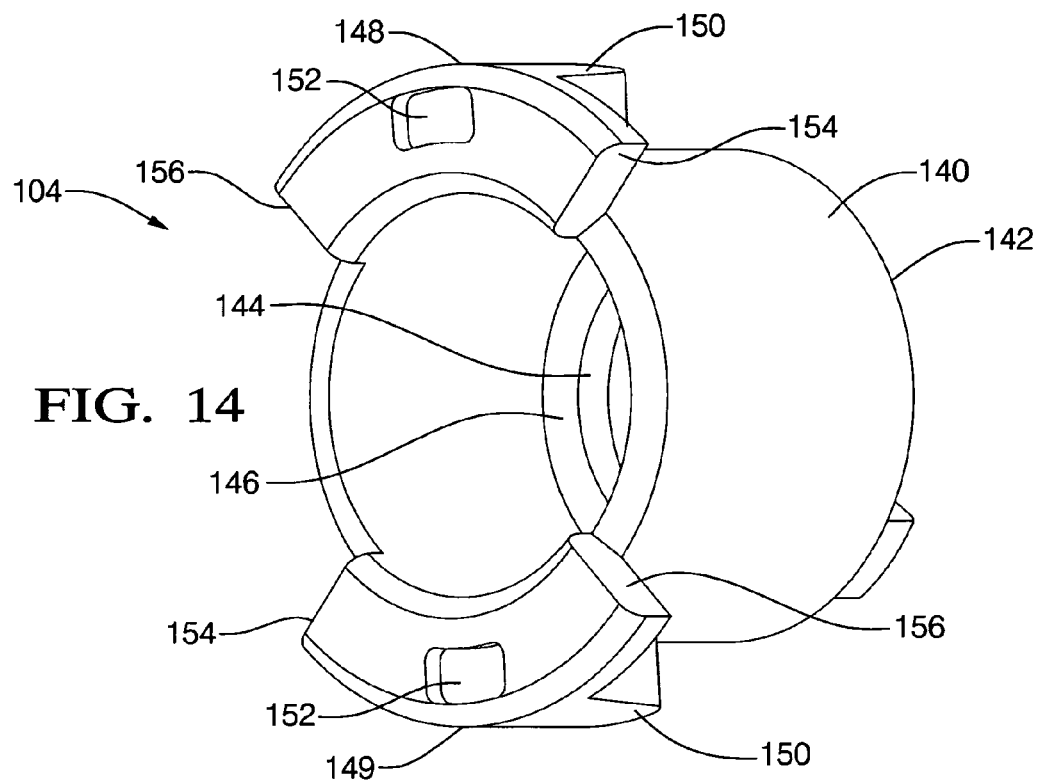
FIGS. 14 and 15 are front and rear perspective views, respectively of the stop shown in FIG. 2.
Figure 15:
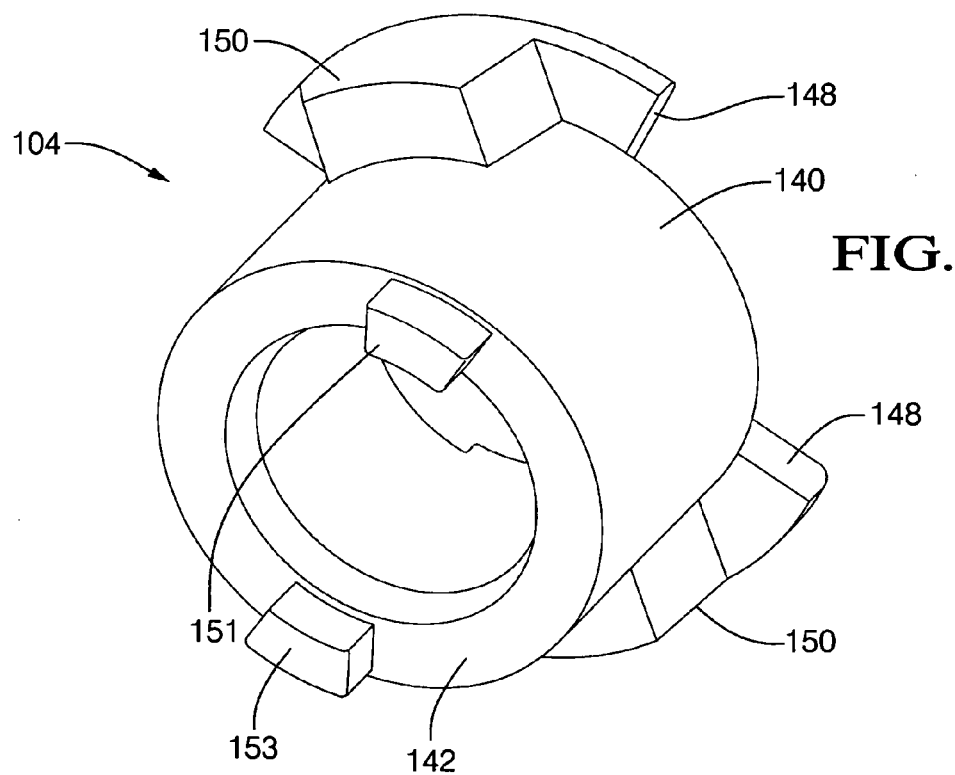
Figure 16:
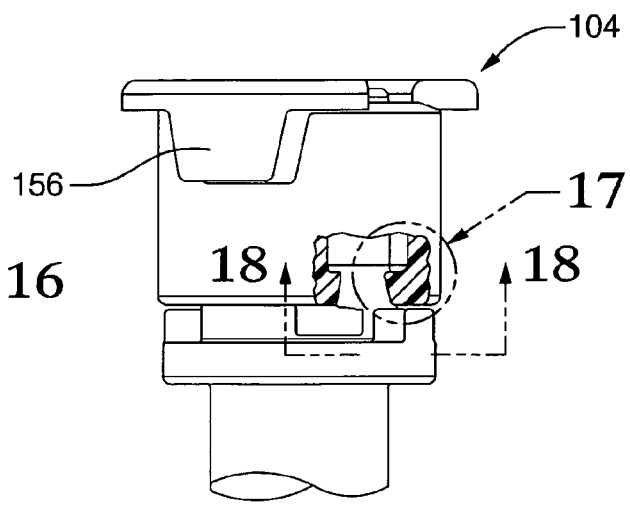
FIG. 16 is a perspective view of the stop-to-rotor interface.
Figure 17:
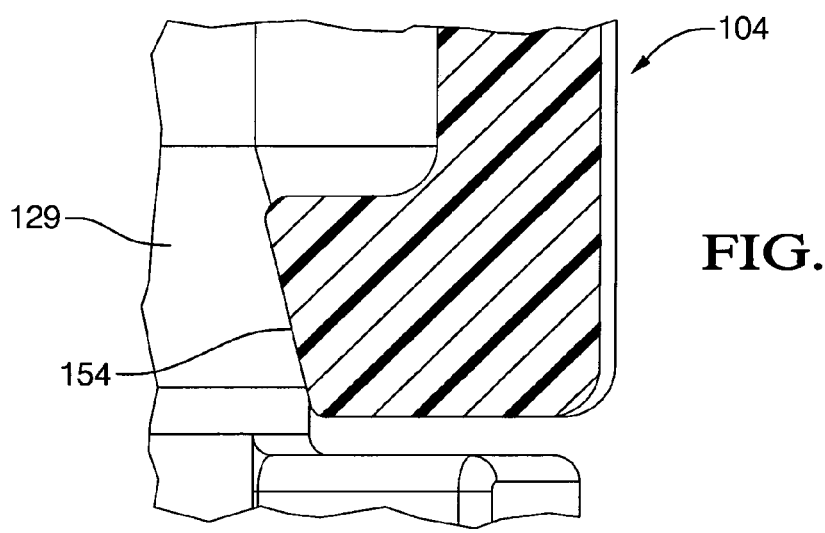
FIG. 17 is an enlarged, cutaway view of the circled portion in FIG. 16.
Figure 18:
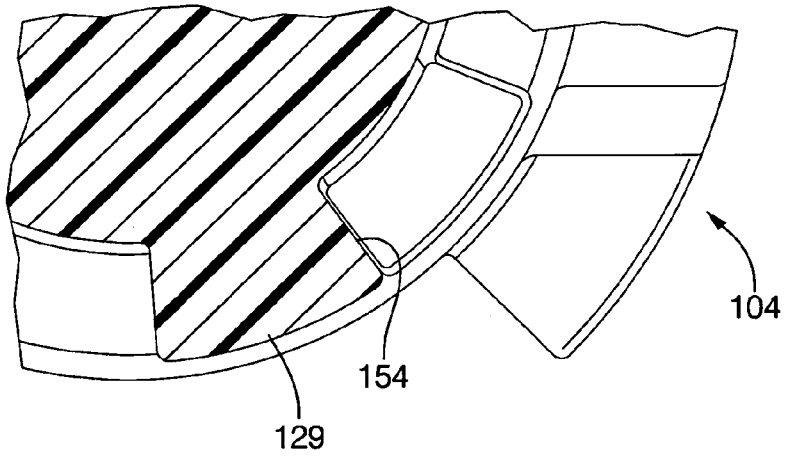
FIG. 18 is a lateral cutaway view also showing the stop-to-rotor interface.

The stop 104 is mounted on the first end 120 of the rotor 102. The stop 104 has a first end 142 and an opposed second end. A cylindrical sleeve 140 extends from the first end to the second end. A reduced diameter opening 144 extends through the first end 142 of the sleeve 140 and opens to a larger diameter interior bore within the sleeve 140. Thrust surfaces 148 and 149 are formed at the second end of the sleeve 140. Recesses 152 may be formed in each thrust surface 148 and 149 for weight savings. Each thrust surface 148 and 149 has opposed ends 154 and 156 which are spaced above the second end of the sleeve 140. The exposed second end portions of the sleeve 140 define crimp surfaces for attaching the stop 104 to the tube 32. Anti-rotation interface members 150 are formed on the exterior surface of the sleeve 140 and extend axially from the thrust surfaces 148 and 149, as shown in FIGS. 14 and 15. The interface surfaces 150 interact with the interface surfaces or keys 129 on the rotor as shown in FIGS. 17-19 to form stops. An additional pair of full throttle and half-throttle stops 151 and 153 are formed on and extend axially from the first end 142 of the sleeve 140. The stops 151 and 153 interact as shown in FIG. 9 during rotation of the throttle relative to the rotor 102 to limit maximum rotation of the throttle.

Figure 21:
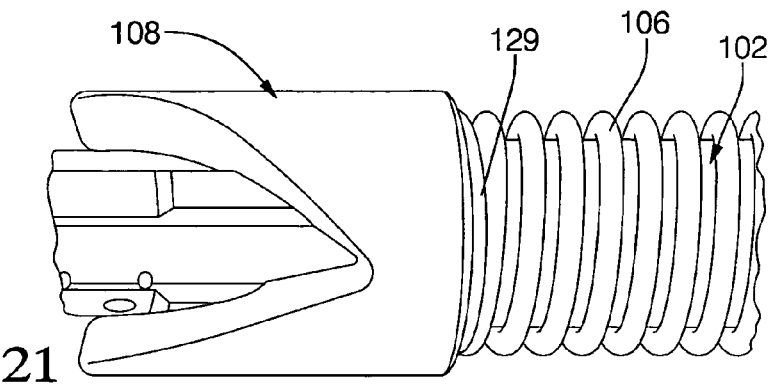
FIG. 21 is an enlarged, perspective view of another aspect of the redundant stop.
Figure 22:
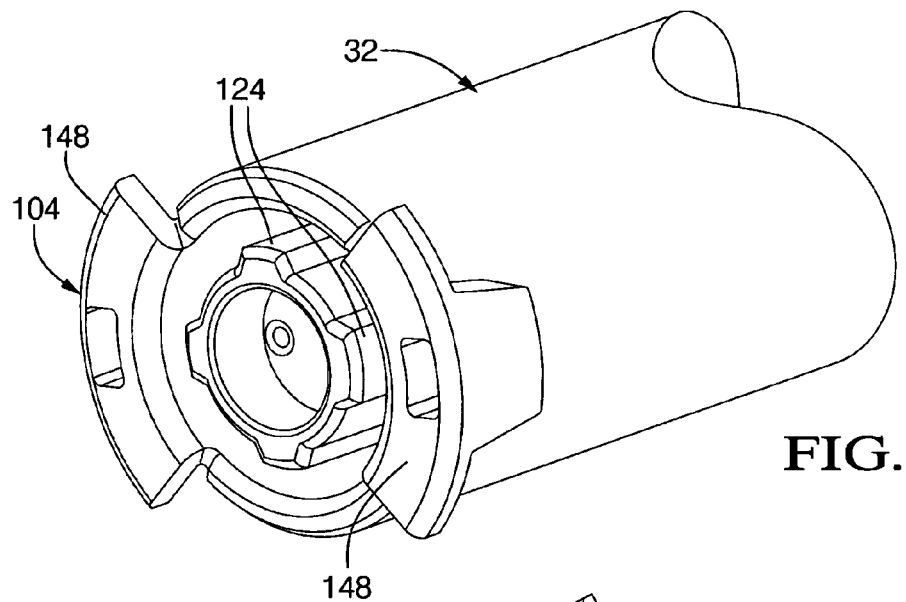
FIG. 22 is an enlarged, perspective view showing the connection of the tube and stop to the sensor cartridge in the tube.
Figure 23:
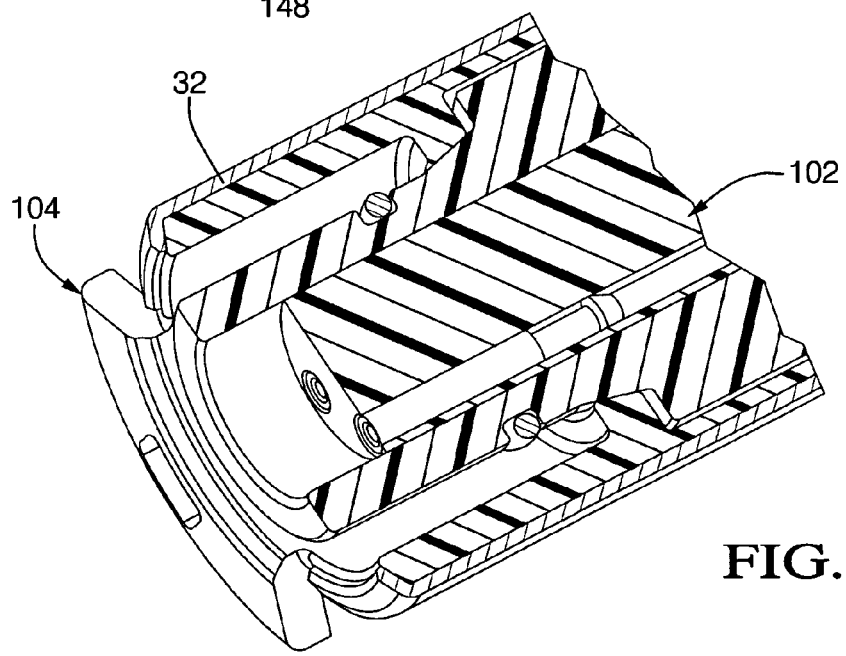
FIG. 23 is a longitudinal cutaway view of the assembly shown in FIG. 22.

Redundant stop surfaces are shown in FIGS. 20 and 21 at the ends 129 of the splines 130 intermediate the length of the shaft portion 128 of the rotor 102. Axial movement of the rotor 102 is limited by engagement of the inner fingers 176 in the cam follower 108 with the ends 129 of the splines 130.

Referring now to FIGS. 24A and 24B and FIGS. 25A-27C, there is depicted the interface between the rotor 102, the cam follower 108, and the cam surfaces 90 on the cam housing 80. The cam follower 108 is formed of a body having a first end 175 and an opposed second cam follower end 177. The first end 175, as shown in FIG. 25B, has a plurality of radially inward extending enlargements 176 which ride within the rotor splines 130. Recesses 178 in the bore straddle the splines 130.

Figure 24:
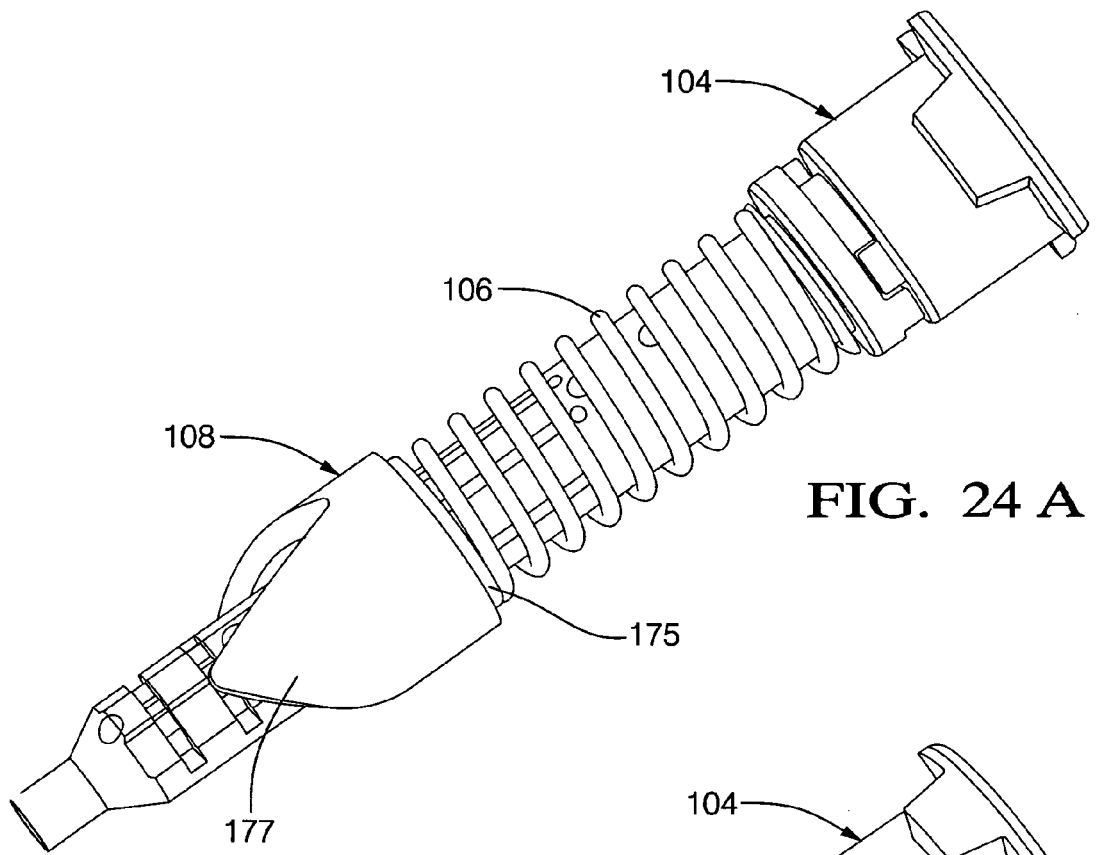
FIG. 24A is an enlarged, perspective view of the cam follower shown in FIG. 2.
FIG. 24B is a perspective view showing the movement of the cam follower on the rotor splines.
Figure 24:
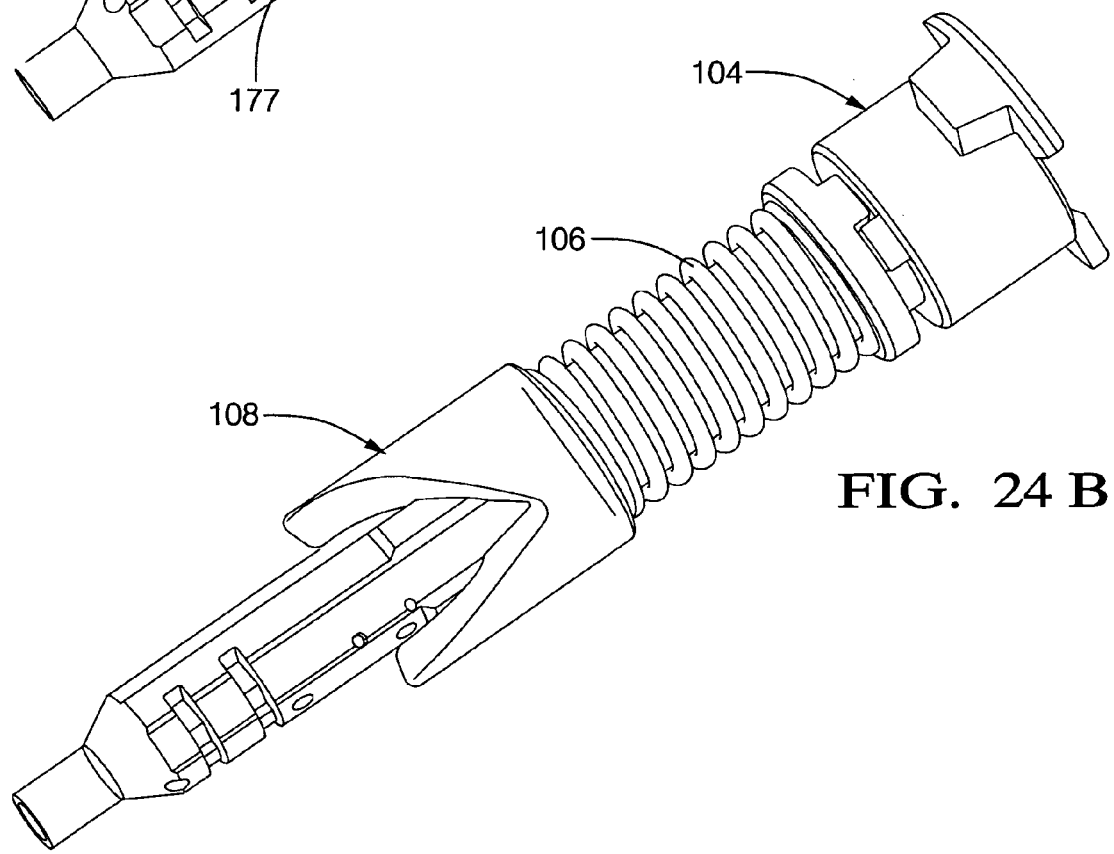
Figure 25:
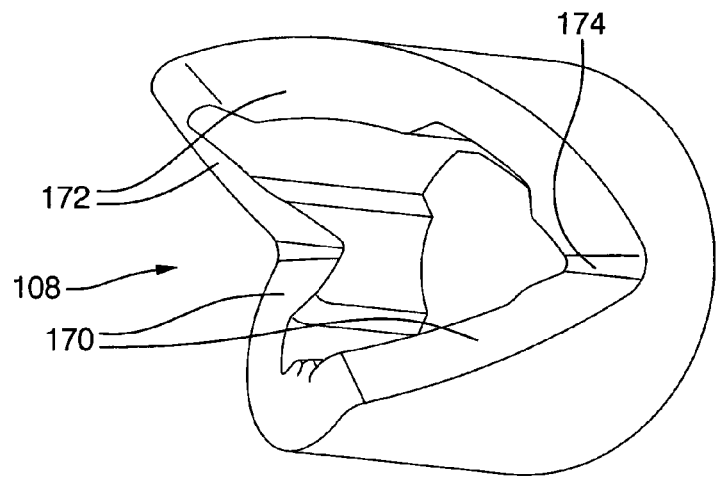
FIG. 25A is a perspective view of the cam follower.
FIG. 25B is a lateral, cross sectional view showing the cam follower-to-rotor interface.
Figure 25:
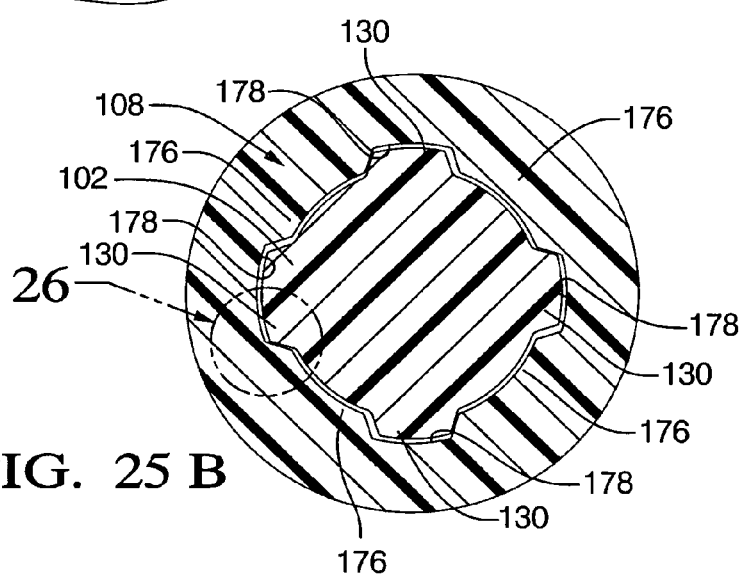
Figure 26:
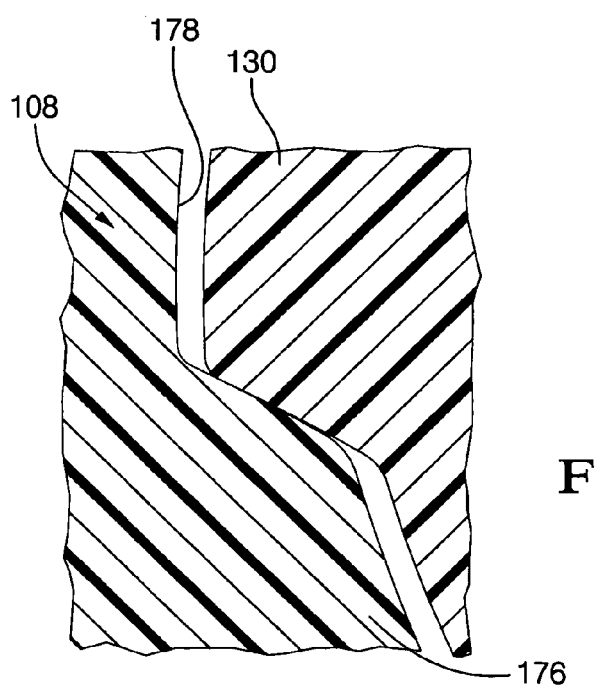
FIG. 26 is an enlarged view of the circled area of FIG. 25.

As shown in FIG. 24A, the second or cam surface end of the cam follower 108 is formed with a pair of identical cam surfaces 170 which has the same high helix angle for off throttle or cruise-off feel. A second pair of cam surfaces 172 is also formed on the cam follower 108 and has the same length and same lower helix angle as the cam surfaces on the cam follower 80 for on throttle feel.

The cam follower 108, as shown in FIGS. 24A and 24B rides along the splines 130 on the rotor 102 and compresses the spring 106 upon axial movement in one direction. The teeth on the cam follower 108 will bottom out at the ends 129 of the splines 130 if the primary stop fails thereby forming a redundant stop to control maximum throttle open position. Release of the rotative force on the throttle enables the spring 106 to move the cam follower 108 back along the spline 130 on the rotor rotating the throttle back to the idled position. This is shown in greater detail in FIGS. 27A, 27B, and 27C.

Figure 28:
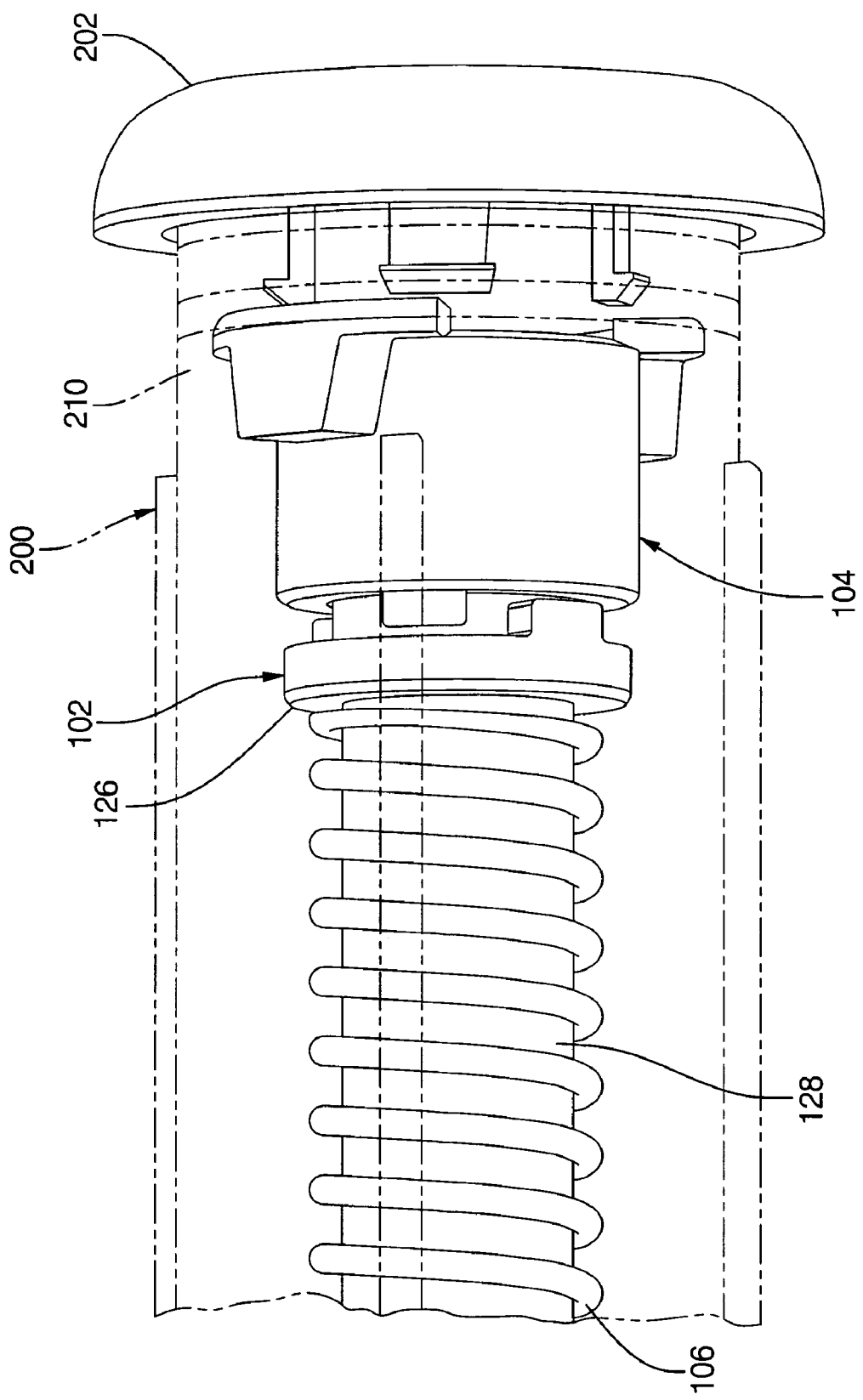
FIG. 28 is an enlarged, transparent view showing the mounting of the end cap and throttle on the cartridge shown in FIG. 2.
Figure 29:
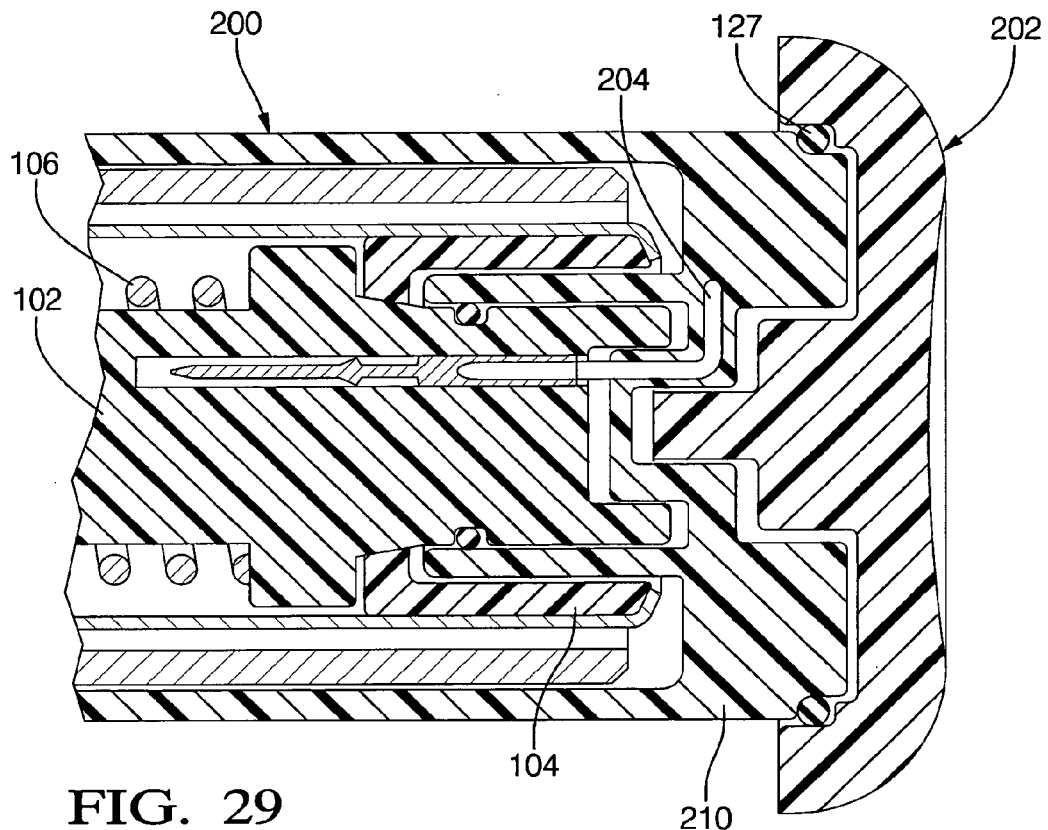
FIG. 29 is a longitudinal, cross-sectional view to the assembled end cap, throttle and cartridge shown in FIG. 28.
Figure 30:
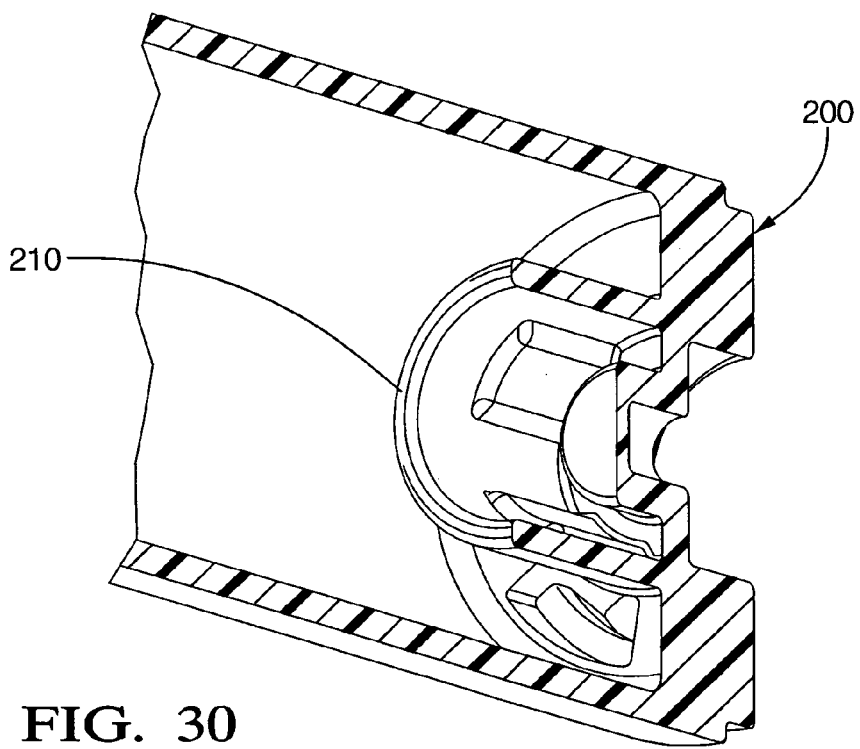
FIG. 30 is a longitudinal, cross sectional view showing the interior of the throttle depicted generally in FIGS. 28 and 29.

The throttle 200 is shown in FIGS. 28 and 29. The throttle 200 includes apertures for receiving fingers or tabs on an end cap 202 to enable the end cap 202 to snap into and close off the end of the throttle 200. As shown by way of example in FIG. 29, a terminal 204 may be mounted within the end of throttle for receiving an electrical pin connection to one of the terminals in the rotor 102 to provide a heated grip termination. The seal 127, such as an O-ring seal, is mounted in the recessed groove in the rotor 102 and engages an inner surface of a collar 210 and the throttle 200 as shown in FIG. 30. The seal 127 compensates for any gap between the outside diameter of the tube 32 and the inside diameter of the handle bar. The seal 127 may also reduce the amount of vibration transferred from the handlebar to the throttle position sensor. Alternately, a plurality of resilient members or tabs, not shown, may extend from the outer surface of the tube 32 to engage the inner surface of the handle bar in order to compensate for any gap between the outside diameter of the tube 32 and the inside diameter of the handlebar.

It may also be possible to form the inside diameter of the handlebar to be snugly received within the tube 32 without the use of the o-ring 127 or resilient members.

The throttle grip, which may include a rubber or resilient gripping surface to be grasped by the rider of the motorcycle, is axially retained on the handlebar by the end cap 202. The throttle grip is angularly oriented with respect to the splines 130 on the rotor 102 to allow for relative adjustments in small increments according to the pitch of the splines.

During operation of the motorcycle 10, the operator may twist the throttle grip 38 to provide a throttle angle input to the throttle position sensor 46. The throttle position sensor 46, in turn, is configured to output a signal that is proportional to the throttle angle input to the ECU. In a motorcycle 10 incorporating a fuel injection system and a cable-actuated throttle, the ECU may utilize the signal to calculate how much fuel should be added to the air entering the engine 22. After calculating how much fuel should be added, the ECU may control one or more fuel injectors (not shown) to add the requisite amount of fuel. In a motorcycle 10 incorporating a drive-by-wire system, the signal output by the throttle position sensor 46 may also be used by the ECU to control the throttle opening.

With reference to FIG. 4, the throttle position sensor 46 is shown in a configuration corresponding to zero throttle angle input. In other words, the throttle opening is substantially closed. However, a sufficient amount of air is allowed through the throttle opening to allow the engine 22 to idle at a low speed. At zero throttle angle input, the throttle position sensor 46 may output a small voltage (e.g., less than 1 volt) to the ECU so the ECU may control the one or more fuel injectors to add the appropriate amount of fuel to maintain the engine 22 at idle speed.

Without any input from the rider of the motorcycle 10, the throttle grip 38 and the throttle position sensor is biased to zero throttle angle input by the engagement of the respective cam surfaces 170, 122 of the cam 154 and the housing 110. As shown in FIG. 4, the spring 158 biases the cam 154 against the housing 110. Due to the contours of the respective cam surfaces 170, 122 of the cam 154 and housing 110, an axial force on the cam 154, such as that provided by the spring 158, causes the cam 154 to rotate about the central axis 54 relative to the housing 110 until the respective stop surfaces 174, 126 of the cam 154 and housing 110 abut. The rotor 50 is forced to rotate with the cam 154 because the cam 154 is splined for co-rotation with the rotor 50.

With reference to FIG. 6, the orientation of the magnet 78 is shown relative to the Hall-effect sensors 146 during zero throttle angle input. The magnet 78 emits a magnetic field, represented by field lines "B." Due to the orientation of the magnet 78 relative to the Hall-effect sensors 146 during zero throttle angle input, the field lines B do not substantially transversely permeate the Hall-effect sensors 146. As a result, the Hall-effect sensors 146 may output a small voltage (e.g., less than 1 volt) to the ECU so the ECU may control the one or more fuel injectors to add the appropriate amount of fuel to maintain the engine 22 at idle speed.

When the rider of the motorcycle 10 desires to accelerate the motorcycle 10, a throttle angle input is provided to the throttle position sensor 46. Due to the engagement of the splines 250, 102 on the throttle grip 38 and the rotor 50, the rotor 50 rotates relative to the housing 110. FIG. 5 illustrates the rotor 50 in a position corresponding with full throttle angle input. Since the cam 154 is splined for co-rotation with the rotor 50, the cam 154 also rotates relative to the housing 110. Rotation of the cam 154 relative to the housing 110 causes sliding contact between the respective cam surfaces 170, 122 of the cam 154 and the housing 110, and the contours of the respective cam surfaces 170, 122 cause the cam 154 to slide along the rotor 50 away from the housing 110, against the bias of the spring 158. When the rider of the motorcycle 10 releases the throttle grip 38, the spring 158 biases the cam 154 toward the housing 110. The respective cam surfaces 170, 122 of the cam 154 and the housing 110, therefore, cause the cam 154 and the rotor 50 to rotate relative to the housing 110 as the cam 154 along the rotor 50. The throttle position sensor 46 is returned to zero throttle angle input when the respective stop surfaces 174, 126 of the cam 154 and the housing 110 abut.

With reference to FIG. 7, the orientation of the magnet 78 is shown relative to the Hall-effect sensors 146 during full throttle angle input. In this orientation of the magnet 78, the field lines B substantially transversely permeate the Hall-effect sensors 146. As a result, the Hall-effect sensors 146 may output a relatively large voltage (e.g., between about 4 and 5 volts) to the ECU so the ECU may control the one or more fuel injectors to add the appropriate amount of fuel to the air passing through the throttle opening.

In the illustrated construction of the throttle position sensor 46, two sensor assemblies 118 are utilized. Incorporating two sensor assemblies 118 in the throttle position sensor 46 provides double redundancy to the fuel injection system. Specifically, one of the Hall-effect sensors 146 sweeps in a positive voltage direction (e.g., between 0 and 5 volts) and the other Hall-effect sensor 146 sweeps in a negative voltage direction (e.g., between −5 and 0 volts). In this manner, the sensors 146 self-check to ensure that the throttle angle input signal received by the ECU is continuous and that the quality of the throttle angle input signal received by the ECU is within specifications.

What is claimed is:

1. A throttle control cartridge comprising:
a first member carrying a Hall-effect sensor;
a second member carrying a magnet, the second member being rotatable and translatable with respect to the first member;
means to position the first member with respect to the second member so that the Hall-effect sensor senses a predetermined magnetic flux density of the magnet;
a cam having a first pair of cam surfaces at first and second cam angles carried by one of the first and second members and a cam follower having a second pair of cam follower surfaces at first and second cam angles, the second cam angles different from first cam angles, the cam follower moving away from the cam responsive to rotation of the second member with respect to the first member in the first direction and engaging the cam and translating the another of the first and second members with respect to the one of the first and second members responsive to rotation of the second member with respect to the first member in an opposition direction;
means to change the magnetic flux density sensed by the Hall-effect sensor in one direction responsive to rotation of the second member with respect to the first member in a first direction; and
means to change the magnetic flux density sensed by the Hall-effect sensor in an opposite direction responsive to translation of the second member with respect to the first member.

2. The control cartridge as defined in claim 1 wherein the magnetic flux density sensed by the Hall-effect sensor is increased responsive to the rotation of the second member with respect to the first member in the direction; and
the magnetic flux density sensed by the Hall-effect sensor is decreased responsive to translation of the second member with respect to the first member.

3. The control cartridge as defined in claim 1 wherein the magnetic flux density sensed by the Hall-effect sensor is increased responsive to the rotation of the second member with respect the first member in the first direction, and the magnetic flux density sensed by the Hall-effect sensor is decreased responsive to translation of the second member with respect to the first member.

4. The throttle control cartridge of claim 1 wherein the first cam angle forms a first helix; and
the second cam angle forms a different helix angle.

5. A throttle control cartridge comprising:

a first member carrying a Hall-effect sensor;

a second member carrying a magnet, the second member being rotatable and translatable with respect to the first member;

means to position the first member with respect to the second member so that the Hall-effect sensor senses a predetermined magnetic flux density of the magnet;

a cam having a cam surface at a first cam angle carried by one of the first and second members and a cam follower having a cam follower surface at second cam angle different from first cam angle carried by another of the first and second members, the cam follower moving away from the cam responsive to rotation of the second member with respect to the first member in the first direction and engaging the cam and translating the another of the first and second members with respect to the one of the first and second members responsive to rotation of the second member with respect to the first member in an opposition direction;

means to change the magnetic flux density sensed by the Hall-effect sensor in one direction responsive to rotation of the second member with respect to the first member in a first direction;

means to change the magnetic flux density sensed by the Hall-effect sensor in an opposite direction responsive to translation of the second member with respect to the first member;

the second member including at least one stop member;

a stop mounted relative to the second member and including a stop positioned to be engaged by the stop on the second member to define a maximum rotation of the second member relative to the first member in one direction of rotation of the second member; and the cam follower and the second member cooperating to form a redundant stop of rotation of the second member relative to the first member.

6. A control cartridge of claim 5 wherein the redundant stop comprises:

axially extending splines formed on the second member;

spline engagement members carried on the cam follower to control axial movement of the cam follower along the second member during rotation of the second member; and the splines on the second member having ends such that engagement of the spline engagement members on the cam follower with the ends of the spline defines the redundant stop of rotation of the second member.

* * * * *